July 3, 1951  S. BUNISH ET AL  2,558,929
RUBBER INSULATED POWER CABLE
Filed April 11, 1947
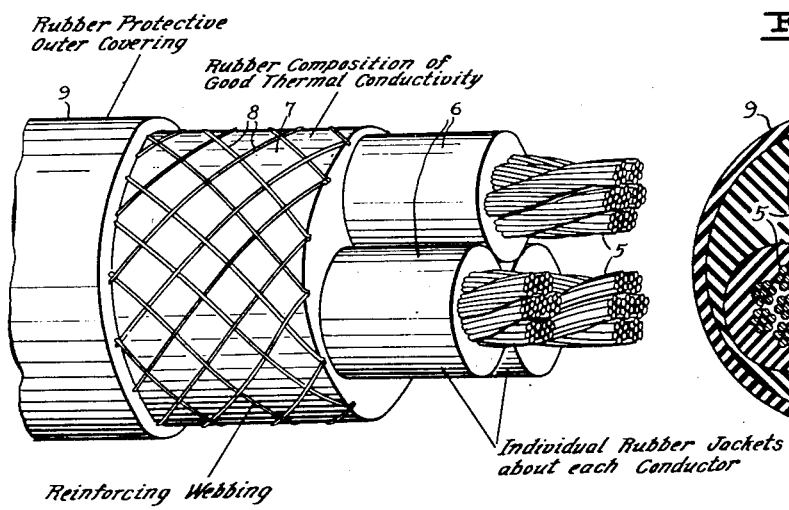
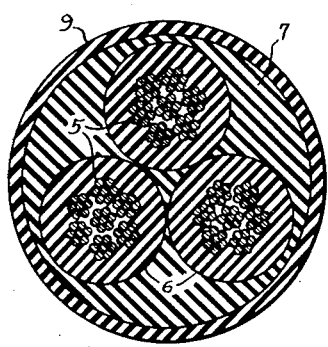
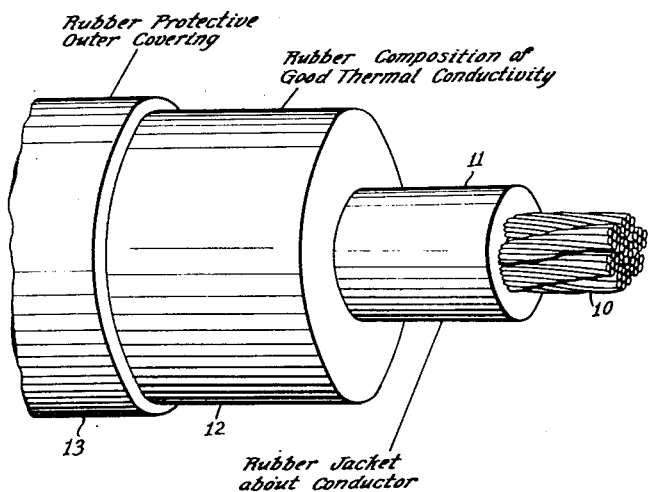
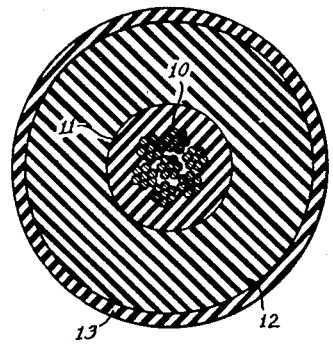
INVENTORS
Hebert C. Witthoft
Stephen Bunish
BY
ATTORNEYS Patented July 3, 1951

2,558,929

UNITED STATES PATENT OFFICE 2,558,929

RUBBER INSULATED POWER CABLE

Stephen Bunish and Herbert C. Witthoft, Marion, Ind., assignors to Anaconda Wire and Cable Company, a corporation of Delaware Application April 11, 1947, Serial No. 740,932

10 Claims. (Cl. 174—116)

This invention relates to rubber-insulated power cables, and provides an improved cable constructed to provide greater safety when substantially overloaded than cables heretofore known or proposed. While it is generally inadvisable to overload power cables, it is impossible to avoid doing so in many services, and consequently cable manufacturers must consider and provide for safe operation of the cable when overloaded for reasonable periods of time.

The safety with which a cable may carry current overloads depends on the maximum temperature which the cable insulation attains during overload operation. The temperature of the insulation is determined not only by the amount of heat generated by the current in the cable conductors, but also by the rate at which the heat so generated is dissipated. In any appreciable length of cable, the heat must be dissipated by conduction through the insulation. Good electrical insulators are also, generally speaking, good heat insulators, and consequently the electrical insulation on a power cable interferes with rapid conduction of heat from the conductor and its dissipation to the atmosphere.

A typical multi-conductor rubber-insulated power cable as heretofore made comprises two or more rubber-insulated conductors side by side, with jute or other fibrous fillers laid in the interstices between the conductors, and with a rubber jacket enclosing the assembly. Sometimes an inner fibrous jacket surrounding the conductors and fillers inside the outer protective jacket also is included in the structure. We have found that the fillers (and inner jacket when employed) contribute largely to limiting the rate of heat conduction from the conductors to the outer surface of the cable. We have also found that a rubber composition containing a substantial amount of graphite possesses good thermal conductivity, as compared with the materials heretofore employed as fillers and elsewhere in the insulation of power cables; and that this material may be used in making components of the cable insulation with the result that the transfer of heat from the conductor through the insulation is substantially increased. We have discovered that an amount of graphite effective for this purpose may still be low enough so as not to impair significantly the dielectric qualities of the rubber insulation.

Based on these discoveries, our invention provides an improved rubber-insulated power cable, characterized in that at least a substantial part of the rubber insulation well beneath the outer surface layer is composed of a rubber composition containing from 5% to 20% by weight of graphite. We have found that at least about 5% by weight of graphite is advisable in order to secure a substantial increase in the thermal conductivity of the rubber composition in which it is included; and that not more than about 20% of graphite should be employed, in order to avoid impairing excessively the dielectric properties of the composition, and also to avoid making the composition too dry to be extruded readily in the course of manufacturing the cable.

Power cables thus constructed, using graphite-containing rubber, may carry overload currents safely for a longer period of time than such heretofore known cables. The thermal conductivity of the graphite-bearing rubber composition is sufficient to permit substantial overload currents to be carried for a substantial length of time without causing the temperature of the cable insulation to rise beyond its safe limit, because the heat developed in the conductor is transmitted more rapidly to the surface of the cable and thence dissipated to the atmosphere.

We have found, in addition to the foregoing, that the character of the filler employed in making up the rubber composition has a substantial effect on its thermal conductivity. Carbon black is a particularly desirable filler, from this standpoint, to use in conjunction with the graphite. Zinc oxide and clay are also satisfactory fillers. On the other hand, whiting (finely divided calcium carbonate) is not such a good filler to employ. Whatever the filler, however, the thermal conductivity of the composition is improved by the addition of graphite in an amount between 5% and 20% by weight, as compared with the thermal conductivity of the same composition without the graphite.

The invention particularly contemplates multi-conductor cables in which the interstices between the conductors are filled with a rubber composition of the character described. However, the invention is not limited to this particular feature. Single-conductor rubber-covered cables, having a substantial part of the insulation well beneath the surface layer thereof composed of graphite-bearing rubber as herein described, are advantageous. Other parts of a multi-conductor cable than the filler in the interstices between conductors may with advantage be made with graphite-containing rubber.

Two embodiments of the invention, as applied to a three-conductor rubber-insulated cable and as applied to a single conductor power cable, are described in greater detail below in conjunction with the accompanying drawings, in which Fig. 1 is a cutaway view of a three-conductor cable made in accordance with the invention;

Fig. 2 is a cross section through the cable shown in Fig. 1; and

Figs. 3 and 4 are views corresponding to Figs. 1 and 2, respectively, of a single-conductor cable according to the invention.

Each of the three stranded conductors 5 of the cable shown in Figs. 1 and 2 is covered with a rubber-insulating jacket 6. A rubber composition 7, which contains graphite and possesses good thermal conductivity, is extruded about the three conductors so as to fill the interstices between the conductors and impart a circular cross section to the structure. A webbing of fibrous strands 8 may be applied over the composition 7 to provide increased mechanical strength against tearing of the composition, particularly in the regions where it is thin, under radially outward forces. The webbing 8 should be of open mesh construction so as to interfere as little as possible with transfer of heat radially through the insulation. An outer rubber jacket 9 is extruded over the webbing to complete the cable.

The characteristic feature of the cable described above is the use of a rubber composition 7 containing 5% to 20% by weight of graphite and having good thermal conductivity to fill the interstices between the jacketed conductor 6 and to round out the cable. The use of such a rubber composition at this point in the cable structure increases the rate of heat transfer from the conductors to the atmosphere during operation of the cable, and so enables the cable to carry a greater current than has heretofore been possible without causing the temperature of the conductor (and of the insulation) to rise beyond a safe value.

Figs. 3 and 4 show a cable generally similar to that shown in Figs. 1 and 2, but having only a single stranded conductor 10. A rubber jacket 11 surrounds the conductor, and is in turn surrounded by a layer 12 of a rubber composition, containing 5% to 20% by weight of graphite, compounded to have good thermal conductivity and at the same time to add to the electrical insulation and mechanical durability of the cable. The cable is completed by a protective outer covering 13 of a rubber composition.

In the cable construction shown in Figs. 3 and 4, the intermediate layer 12 of graphite-containing rubber replaces a substantial part of the rubber normally employed in making the conductor jacket 11 and the outer covering 13. Because of its good thermal conductivity, the layer 12 enables the conductor to carry current overloads more safely than would be possible with an equivalent thickness of ordinary rubber insulation. While the layer 12 could replace the whole or both the inner jacket 11 and the outer covering 13, the combination shown in Figs. 3 and 4 has the advantage that the conductor is surrounded with a rubber compound particularly designed to have maximum dielectric strength, while the cable as a whole is enclosed in a protective outer rubber covering specifically compounded to provide maximum mechanical protection.

Typical rubber compositions of improved thermal conductivity that may be employed in accordance with the invention are given in the following examples:

*Example I*

| Ingredient | Per cent by Weight |
|---|---|
| Rubber Stock | 35.0 |
| Stabilizer (e. g., "Altax") | 0.25 |
| Mineral Rubber (Plasticizer) | 5.00 |
| Carbon Black | 10.00 |
| Light Oil (Plasticizer) | 3.00 |
| Stearic Acid | 1.00 |
| Graphite | 10.00 |
| Clay | 30.75 |
| Zinc Oxide | 5.00 |

The "Altax" stabilizer referred to in the above example is defined in the "Vanderbilt Rubber Handbook," 8th edition, published 1942, as a commercially pure benzothiazyl disulfide, which is prepared by oxidizing commercially pure mercaptobenzo thiazole.

*Example II*

| Ingredient | Per cent by Weight |
|---|---|
| Rubber Stock | 38.00 |
| Stearic Acid | 0.50 |
| Stabilizer | 1.25 |
| Oily Plasticizer | 2.00 |
| Calcined Magnesia | 1.50 |
| Carbon Black | 44.25 |
| Graphite | 10.00 |
| Zinc Oxide | 2.50 |

*Example III*

| Ingredient | Per cent by Weight |
|---|---|
| Rubber stock | 38.00 |
| Stearic Acid | 0.50 |
| Stabilizer | 1.25 |
| Oily Plasticizer | 2.00 |
| Calcined Magnesia | 1.50 |
| Carbon Black | 34.25 |
| Graphite | 20.00 |
| Zinc Oxide | 2.50 |

The usual vulcanizing agents and accelerators are not listed in the foregoing examples, but they are of course incorporated in the composition in the customary small amounts.

Of the above three exemplary compositions, the second is generally the most satisfactory, because its thermal conductivity is somewhat better than the first, and its suitability for extrusion in cable manufacture is better than the third. The improved thermal conductivity of the composition of Example II, as compared with that of Example I, results from the elimination of mineral rubber and reduction in the amount of oily plasticizer, both of which we have found tend to decrease the thermal conductivity of rubber compositions. Further, the clay employed in the composition of Example I is not quite so good a filler from the standpoint of thermal conductivity of the composition as is the carbon black employed in Examples II and III.

The composition of Example III possesses better thermal conductivity than does the composition of Example II, owing to the increased percentage of graphite. However, 20% by weight of graphite is about the upper limit on the amount of this ingredient that may be employed without rendering the composition too dry and stiff for extrusion during manufacture of the cable. In addition, 20% by weight of graphite is about the maximum that can be employed without decreasing the electrical resistivity of the composition too much for it to serve effectively as an insulator. It is chiefly because the graphite in Example III is at about the upper limit of its range that this composition is generally not so much preferred as the composition of Example II, containing a somewhat smaller, but yet effective, amount of graphite.

The thermal conductivities of the foregoing rubber compositions have been measured in the following manner: A circular disc of the rubber composition, ¾ of an inch thick by 6 inches in diameter, at a temperature of 77° F., is placed on a controlled-temperature hot plate, the surface of which is maintained at 280° F. The time required for the upper surface of the disc, at its midpoint, to reach 160° F., is measured. Using this test, a sample made from a composition according to Example I, in which "neoprene" gum stock was employed as the rubber stock, required 25 minutes for its upper surface to reach 160° F. ("Neoprene" is a polymerized chloroprene product.) Another sample, made according to Example II, again using "neoprene" gum stock, required 18 minutes for its upper surface to reach 160° F. A third sample prepared according to Example III, again using "neoprene" gum stock, required about 15 minutes for its upper surface to reach 160° F.

The electrical resistivity of the rubber compositions made according to Examples I and II were amply high for power cable insulation purposes, being over $2 \times 10^8$ ohms per cubic centimeter. The rubber composition according to Example III had a resistivity at 75° F. of $4 \times 10^6$ ohms per cubic centimeter. Greater amounts of graphite than 20% by weight decrease the electrical resistivity still further.

While the foregoing data relates particularly to samples compounded with "neoprene" gum stock, other rubber gum stocks may also be used in making up the rubber composition, both synthetic gum stocks—such as "Buna" ("GR-S") rubber gum (a copolymer of butadiene and styrene) and butyl rubber gum (a copolymer of butadiene and isoprene)—and natural rubber gum stock. The thermal conductivity of the rubber composition is affected somewhat by the gum stock chosen, as some gum stocks possess better thermal conductivity than others. The amount of variation caused by using different gum stocks, however, is not large, and ordinarily the choice of gum stock will not depend on its effect on the thermal conductivity of the compound, but rather on its other physical properties and its availability.

The thermal conductivity of the composition is considerably affected by the fillers used in preparing the compound. Carbon blacks that yield a soft compound, such as the finely-divided soft carbon black obtained by thermal decomposition, or cracking of natural gas and sold under under the designation "P-33," are particularly advantageous from the standpoint of yielding a compound having good thermal conductivity. Other carbon blacks that yield a stiffer compound are not quite so good from the standpoint of thermal conductivity, but are satisfactory. Zinc oxide is a filler that is very satisfactory from the standpoint of the thermal conductivity of the rubber. Clay-filled rubber compounds will generally possess a somewhat lower thermal conductivity than compounds in which carbon black or zinc oxide is employed; and whiting is not quite so good even as clay. Regardless of the filler employed, however, the inclusion of graphite in an amount from 5% to 20% by weight substantially enhances the thermal conductivity of the composition, as compared with a similar composition containing no graphite.

In the cable structure shown in the drawings, the graphite-containing rubber composition is not primarily relied upon for electrical insulation, since the conductors are jacketed with conventional rubber insulating compounds, and the cable structure is enclosed by a conventional insulating outer covering. However, if the amount of graphite present in the composition does not exceed the upper limit of 20% by weight, the graphite-bearing composition may be used as the primary insulation for cables destined for ordinary low-voltage power service (i. e., for services where the maximum potential across the insulation is of the order of 600 volts or less).

It is particularly desirable to construct the cable so that the graphite-containing rubber forms a substantial part of the insulation well below the outer surface of the cable and near (or even in contact with) the conductors, because this is the part of the cable where a maximum rate of heat transfer is desired in order to achieve maximum safety during overload operation.

A cable made substantially as shown in Fig. 1 has been compared with a similar cable using the same number and size of conductors but constructed in the conventional fashion with jute fillers in the interstices between the insulated conductors, in place of graphite-containing rubber. The same current which caused the conductor temperature to reach almost 500° F. in 10 minutes in the conventional cable with jute fillers, caused the conductor temperature to reach a value of less than 400° F. in the same length of time in the new cable.

The increased safety of the new cable during overload operation results from two factors: In the first place, the high thermal conductivity of the graphite-containing rubber, by limiting the temperature attained by the insulation during the period of the overload, reduces the extent to which the insulation is injured by thermal decomposition, as compared with heretofore known cables. The rate at which chemical reactions proceed (including thermal decomposition reactions) approximately doubles with each 10° C. rise in temperature. Hence the rate at which deterioration of the insulation of the new cable occurs during overload operation is reduced by a very large factor, as compared with heretofore known cables that under comparable overload conditions might become 50° to 100° C. hotter. In the second place, if a short-circuit should occur during overload operation of the cable and the insulation should be set afire in the vicinity of the short-circuit, the fact that the insulation elsewhere is at a lower temperature than would be the case with heretofore known cables enables the insulation of the new cable to resist propagation of the flame along the cable more effectively. Hence the fire hazard involved when the new cable is overloaded is less than that when cables as heretofore known are subjected to equivalent overloads. The new cable thus is especially advantageous for such purposes as supplying power to coal mining machinery—a service that not only imposes overloads on the cable from time to time, but that also involves a substantial fire hazard.

While the new cable may be used with some greater safety than previously known cables at current loadings of 100% to 150% of rated value, the benefits of the new cable are most apparent when higher overloads up to 300% or more are applied. Overloads of this magnitude are not uncommon in the operation of mining machinery, where handling of large blocks of the material being mined quite often requires a very large amount of power for a short period of time.

We do not imply, in what has been said above, that operation of the new cable at above its normal current rating (based on the size of the conductors) is generally permissible and safe. We have merely pointed out that in those services where power cables are unavoidably overloaded from time to time, the new cable provides a substantially greater margin of safety than cables heretofore known.

We claim:

1. Rubber-insulated power cable comprising a plurality of conductors each having a rubber insulating jacket, a filler in the interstices between the insulated conductors, and a rubber outer covering, the filler being a rubber composition which contains 5% to 20% by weight of graphite, has an electrical resistivity at 75° F. of at least $4 \times 10^6$ ohms per cubic centimeter and possesses sufficiently good thermal conductivity that the midpoint of the upper surface of a layer thereof 6 inches in diameter and three-fourths of an inch thick, originally at a temperature of 77° F., will reach a temperature of 160° F. at least within 25 minutes when the layer is placed on a hotplate maintained at 280° F.

2. Cable according to claim 1, in which the filler also contains from about 10% to 45% by weight of carbon black in addition to the graphite.

3. Cable according to claim 2, in which the filler contains about 45% by weight of carbon black and about 10% by weight of graphite.

4. Rubber-insulated power cable comprising at least one conductor, an outer insulating jacket, and rubber insulation between the conductor and the outer insulating jacket composed of a rubber composition which contains from 5% to 20% by weight of graphite, has an electrical resistivity at 75° F. of at least $4 \times 10^6$ ohms per cubic centimeter and possesses sufficiently good thermal conductivity that the midpoint of the upper surface of a layer thereof 6 inches in diameter and three-fourths of an inch thick, originally at a temperature of 77° F., will reach a temperature of 160° F. at least within 25 minutes when the layer is placed on a hotplate maintained at 230° F.

5. Cable according to claim 4 in which said rubber composition also contains from about 10% to 45% by weight of carbon black.

6. A power cable comprising a plurality of conductors, fillers in the interstices between the conductors composed of a rubber composition which contains 5% to 20% by weight of graphite, has an electrical resistivity at 75° F. of at least $4 \times 10^6$ ohms per cubic centimeter and possesses sufficiently good thermal conductivity that the midpoint of the upper surface of a layer thereof 6 inches in diameter and three-fourths of an inch thick, originally at a temperature of 77° F., will reach a temperature of 160° F. at least within 25 minutes when the layer is placed on a hotplate maintained at 280° F.

7. Cable according to claim 6 in which the rubber composition also contains from about 10% to 45% by weight of carbon black.

8. Cable according to claim 6 in which the rubber composition contains about 10% by weight of graphite, and which also contains about 45% by weight of carbon black.

9. A power cable comprising a conductor, a rubber insulating jacket surrounding the conductor, and a layer surrounding the rubber insulating jacket comprising a rubber composition which contains 5% to 20% by weight of graphite, has an electrical resistivity at 75° F. of at least $4 \times 10^6$ ohms per cubic centimeter and possesses sufficiently good thermal conductivity that the midpoint of the upper surface of a layer thereof 6 inches in diameter and three-fourths of an inch thick, originally at a temperature of 77° F., will reach a temperature of 160° F. at least within 25 minutes when the layer is placed on a hotplate maintained at 280° F.

10. A power cable of the character described comprising a conductor surrounded by an insulating rubber jacket, a layer of rubber composition surrounding said jacket which contains 5% to 20% by weight of graphite, has an electrical resistivity at 75° F. of at least $4 \times 10^6$ ohms per cubic centimeter and possesses sufficiently good thermal conductivity that the midpoint of the upper surface of a layer thereof 6 inches in diameter and three-fourths of an inch thick, originally at a temperature of 77° F., will reach a temperature of 160° F. at least within 25 minutes when the layer is placed on a hotplate maintained at 280° F., and a protective rubber covering surrounding said layer of graphite-containing rubber.

STEPHEN BUNISH.
HERBERT C. WITTHOFT.

REFERENCES CITED

The following references are of record in the file of this patent:

UNITED STATES PATENTS

| Number | Name | Date |
|---|---|---|
| 1,977,325 | Pfannkuch | Oct. 16, 1934 |
| 2,096,840 | Bormann | Oct. 26, 1937 |
| 2,142,625 | Zoethout | Jan. 3, 1939 |
| 2,234,068 | Wiseman | Mar. 4, 1941 |
| 2,286,826 | Morrison | June 16, 1942 |

FOREIGN PATENTS

| Number | Country | Date |
|---|---|---|
| 526,895 | England | Sept. 27, 1940 |

OTHER REFERENCES

An article, "Electrically Conducting Neoprene and Rubber," by Habgood and Waring, found in "Rubber Chemistry and Technology," vol. 15; 1942, pp. 146–157; "Mix No. F. 5703" in Table VI on page 153; copy in Div. 65 in class 174–102 (2).

The book "Science of Rubber" by K. Memmler; American ed. by Dunbrook and Morris, 1934; published by Reinhold Publ. Corp., N. Y.; pp. 463–465; copy in Div. 15 marked TS1890, M42.